(12) United States Patent  
Sunderland et al.

(10) Patent No.: US 8,651,292 B2  
(45) Date of Patent: Feb. 18, 2014

(54) CAR TRAY

(75) Inventors: Jay Lee Sunderland, Lewis City, OH (US); Joseph Eugene Ramion, Acworth, GA (US)

(73) Assignee: Car Trays, LLC, Lewis Center, OH (US)

( * ) Notice: Subject to any disclaimer, the term of this patent is extended or adjusted under 35 U.S.C. 154(b) by 378 days.

(21) Appl. No.: 13/111,525

(22) Filed: May 19, 2011

(65) Prior Publication Data

US 2011/0247531 A1  Oct. 13, 2011

Related U.S. Application Data

(63) Continuation-in-part of application No. 12/617,727, filed on Nov. 13, 2009, now abandoned.

(51) Int. Cl.  
*A47F 5/08* (2006.01)

(52) U.S. Cl.  
USPC ............... 211/88.01; 211/133.3; 108/145; 224/483; 439/668

(58) Field of Classification Search  
USPC ............ 211/126.1, 85.4, 88.01, 90.01, 90.02, 211/126.4, 126.5, 126.14, 133.1, 133.3, 211/133.4; 108/44–46, 152, 145, 147.2, 108/147.19; 224/311, 282, 553, 554, 482, 224/483, 563, 564, 926; 439/668, 669; 403/91, 101; 248/224.7, 222.41

See application file for complete search history.

(56) References Cited

U.S. PATENT DOCUMENTS

| | | | | |
|---|---|---|---|---|
| 1,261,363 | A * | 4/1918 | Crist | 248/165 |
| 2,636,633 | A * | 4/1953 | Carlson | 220/23.4 |
| 2,707,141 | A * | 4/1955 | Witter | 108/26 |
| 3,039,616 | A * | 6/1962 | Proffit | 224/482 |
| 4,619,386 | A * | 10/1986 | Richardson | 224/277 |
| 4,852,499 | A * | 8/1989 | Ozols | 108/44 |
| 5,106,003 | A * | 4/1992 | Ma | 224/311 |
| 5,414,770 | A * | 5/1995 | Wang | 379/446 |
| 6,317,497 | B1 * | 11/2001 | Ou | 379/454 |
| 6,971,527 | B2 * | 12/2005 | Chandaria | 211/13.1 |
| 7,635,112 | B2 * | 12/2009 | Lin | 248/276.1 |

* cited by examiner

*Primary Examiner* — Korie H Chan  
(74) *Attorney, Agent, or Firm* — Okuley Smith, LLC

(57) ABSTRACT

The invention disclosed is a positionable utility tray. The tray apparatus is adapted to be mounted in the interior of an automobile and can be fixed in a chosen position by locking a securing mount into a vehicle receiving socket, such as an auxiliary power outlet. The invention utilizes a securing mount using a tapered plunger and expanding collet to force fingers outwardly onto the socket inner surface, thereby securing the utility tray. The utility tray further utilizes fastener projections to mount tray accessory components such as trash cans, mobile device holders, and the like.

11 Claims, 2 Drawing Sheets

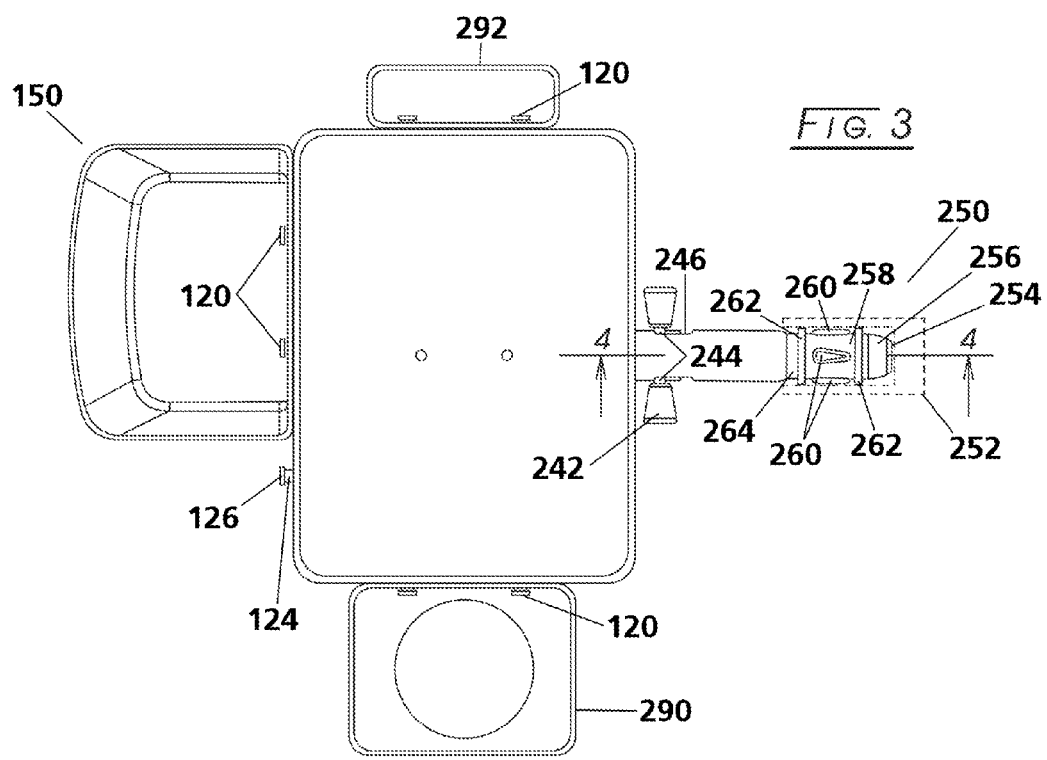
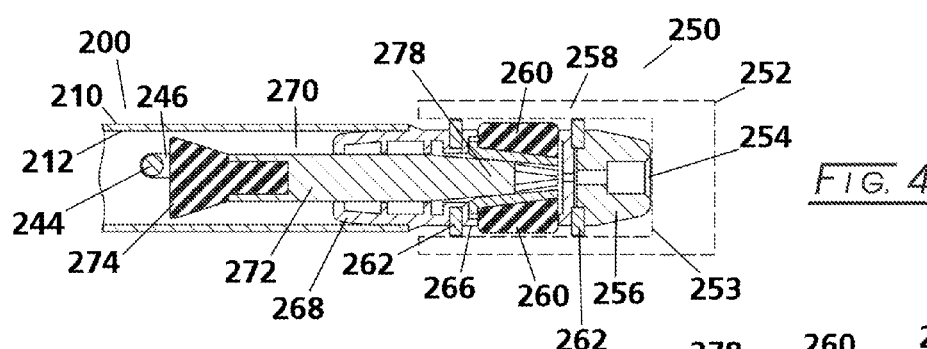
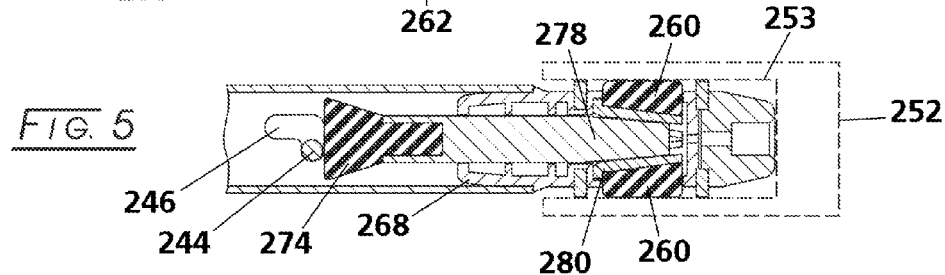

CAR TRAY

CROSS-REFERENCE TO RELATED APPLICATIONS

This application is a continuation-in-part and claims the benefit of United States nonprovisional patent application Ser. No. 12/617,727, filed on Nov. 13, 2009, the entire contents of each being hereby incorporated by reference.

STATEMENT REGARDING FEDERALLY SPONSORED RESEARCH

None.

BACKGROUND OF THE INVENTION

The present invention relates generally to the design and configuration of mechanical devices, and more specifically to a new and useful utility tray adapted to be mounted in the interior of an automobile into a securing socket, such as its auxiliary power outlet, also commonly referred to as a cigarette lighter.

With automobile travel being ubiquitous in modern times, an increasing number and diverse amount of activities are carried out while individuals are in their cars. Fast food restaurant chains, for example, litter the landscape, and the practice of eating in the automobile has become extremely commonplace. Many automobiles now come equipped with multimedia players (e.g., DVD viewers) and a plethora of device interfaces (e.g., USB inputs). As a result, more work can be carried out while inside of the automobile.

Because most automobiles are designed primarily for traveling between geographically distant locations, simple workspaces are often difficult to incorporate into the design. Therefore, many automobile owners can have difficulty with finding suitable surfaces areas on which to place food, computers, papers, and the like. Some drive-in restaurants provide tray tables that attach to or hook onto the door or window of the automobile for use while parked at the restaurant. However, such simple solutions do not provide portability, maneuverability, adjustability, and or protection from the elements. For example, rain can make the prospect of leaving food on a tray table outside of the car interior undesirable, as the food can become soggy, or the interior of the automobile and its occupants can be exposed to the elements. Such trays also cannot be positioned over one or more persons' laps so as to provide protection from dropped food items, and may often conflict with the design of the automobile's interior when hung on the inside of the car door or window. Thus, adjustability and maneuverability are impinged, and it is demonstrated that a new and useful device is needed that will provide automobile occupants with a convenient utility tray surface area and mounting system that is adjustable and universal in its application. Furthermore, there is a need for a utility tray and universal mounting system that will permit temporary use of a work area within an automobile that may be stored and carried by the vehicle occupant when not in use.

Furthermore, some prior art solutions to these problems have provided for small, somewhat-adjustable tray surfaces for mounting in the interior of the vehicle by some manner. However, many of these solutions provide a small amount of surface area for use by the automobile occupant in order to save space. This small amount of surface area can be problematic when the vehicle occupants purchase multi-item meals, or generally when a tray surface is needed for many individual items. Therefore, a solution is needed that will provide increased storage area and usable space without further inhibiting the use of the interior features of the automobile, obstructing or preventing normal usage of any seating area within the vehicle, or impinging on its ability to be mounted universally.

The following patents were considered as relevant, but do not disclosed the invention claimed herein: U.S. Pat. No. 1,261,363 to Crist, U.S. Pat. No. 2,636,633 to Carlson, U.S. Pat. No. 2,707,141 to Witter, U.S. Pat. No. 3,039,616 to Proffit, U.S. Pat. No. 4,619,386 to Richardson, U.S. Pat. No. 4,852,499 to Ozols, U.S. Pat. No. 5,106,003 to Ma, U.S. Pat. No. 5,414,770 to Wang, U.S. Pat. No. 6,317,497 to Ou, U.S. Pat. No. 6,971,527 to Chandaria, and U.S. Pat. No. 7,635,112 to Lin.

BRIEF SUMMARY OF THE INVENTION

The present invention is embodied in an apparatus that provides a portable personal workstation apparatus as a positionable utility tray with a planar tray top surface, a tray bottom surface; and at least one edge surface substantially orthogonal to the tray top surface and the tray bottom surface, and having at least one fastener projection extending outwardly from the at least one edge surface and having a fastener head portion and a fastener neck portion. Optionally, one or more workstation accessories with a keyhole shaped aperture allows for releasably securing a workstation accessory, such as a paper pad, a waste receptacle, drink holder, food holder, or the like to the fastener projection of the utility tray.

Further provided is a tray support system comprising a telescopically extendable elongate extending arm having a length, a proximal end, and a distal end, a first pivot connection between the extending arm distal end and the tray bottom surface; an elongate securing arm having a proximal end, a distal end, with a second pivot connection between the extending arm proximal end and the securing arm distal end, said securing arm having an axis, an interior surface, an exterior surface wherein the exterior surface cross section with respect to the securing arm axis defines a securing arm exterior boundary, and two slide lock slots cut through the securing arm interior and exterior surfaces and positioned symmetrically about a plane of symmetry intersecting the securing arm axis; and a workstation securing mount for engaging with a securing socket comprising within the securing arm a cylindrical plunger comprising a plunger axis aligned with the securing arm axis, said plunger further comprising a proximal tapered expansion end, a cylindrical shaft, connecting a distal resilient buffer end, bearing against a securing arm slide pin, said expansion end cross section with respect to the plunger axis forming a wedge at the proximal end, wherein the plunger is supported by a plunger collar and slidable with respect to the securing arm interior surface.

The slide pin is coupled to the plunger buffer end and positioned orthogonally with respect to the securing arm axis and the plunger axis, allowing the plunger to be reversibly positioned in a locking position and further comprising a coaxial expanding collet positioned to receive the plunger expansion end and having an inner cross section diameter profile with respect to the securing arm axis such that moving the plunger expansion end into the locking position expands the expanding collet radially outward from the securing arm axis; and a plurality of rubber fingers distributed in radial positions about the securing arm axis, each of the plurality of rubber fingers having an interior surface and an exterior surface, wherein the interior surface abuts the expanding collet such that when the plunger is advanced into the locking position, the exterior surface of each rubber finger moves radially outward from the securing arm axis and beyond the securing arm exterior boundary, thereby creating a larger effective radius whereby placement of the securing end into the socket, and advancing the slide pin to the locking position secures the securing end with the socket, allowing the extending arm and utility tray to be positioned as determined by the user, allowing the tray top surface to be used to hold personal items, and a workstation accessory to be mounted on the fasteners.

As described the apparatus is further embodied in the securing arm is provided for mating with a socket provided for engaging a vehicle power outlet, such as a vehicle power outlet that is a cigarette lighter port accessible to a vehicle operator.

A further embodiment of the apparatus provides for the pivot connections to be lockably positionable about an angle more than 90 degrees, preferably about an angle of between 10 and 350 degrees, and further rotatable about the angle of pivot 360 degrees. In yet another embodiment the apparatus extending arm is positionable at two or more predetermined lengths by detent locks, and more preferably three or four or five predetermined lengths.

Another embodiment disclosed is a cylindrical securing mount for engaging with a socket comprising an elongate cylindrical securing arm having a proximal end, a distal end, an axis, an interior surface, an exterior surface wherein the exterior surface cross section with respect to the securing arm axis defines a securing arm exterior boundary, and two slide lock slots cut through the securing arm interior and exterior surfaces and positioned symmetrically about a plane of symmetry intersecting the securing arm axis; within the securing arm a cylindrical plunger comprising a plunger axis aligned with the securing arm axis, said plunger further comprising a proximal conically tapered expansion end, a cylindrical shaft, connecting a distal resilient buffer end, said buffer end bearing against a securing arm slide pin, said expansion end cross section with respect to the plunger axis forming a conical wedge at the proximal end, wherein the plunger is supported by a plunger collar and slidable with respect to the securing arm interior surface; the slide pin coupled to the plunger buffer end and positioned orthogonally with respect to the securing arm axis and the plunger axis, allowing the plunger to be reversibly positioned in a locking position; a coaxial expanding collet positioned to receive the plunger expansion end and having an inner cross section diameter profile with respect to the securing arm axis such that advancing the plunger expansion end into the locking position expands the expanding collet radially outward from the securing arm axis, expanding a resilient latching cylinder; and a plurality of rubber fingers distributed in radial positions on the exterior surface of the latching cylinder about the securing arm axis, each of the plurality of rubber fingers having an interior surface and an exterior surface, wherein the interior surface abuts the expanding collet such that when the plunger is advanced into the locking position, the exterior surface of each rubber finger moves radially outward from the securing arm axis and beyond the securing arm exterior boundary, thereby creating a larger effective radius, whereby the securing mount can be placed in a socket, the slide pin advanced to the locking position, and the rubber fingers engage with the interior of the socket, holding the securing mount in place within the socket.

BRIEF DESCRIPTION OF THE DRAWINGS

For a fuller understanding of the nature and advantages of the present invention, reference should be had to the following detailed description taken in connection with the accompanying drawings, in which:

FIG. 3 shows a top view of an embodiment of the disclosed invention;

FIG. 4 shows a side view taken through plane 4-4 in FIG. 3, with the slide lock in the unlocked position;

FIG. 5 shows a side view taken through plane 4-4 in FIG. 3, with the slide lock in the locked position;

DETAILED DESCRIPTION OF THE INVENTION

Disclosed herein is an apparatus that provides a portable personal workstation apparatus that is specially configured for use in a vehicle. The apparatus allows a tray to be accurately positioned at the discretion of the user, and to removeably secure the apparatus on a socket mount. The most common socket mount with which the apparatus will be employed is a power outlet, i.e. a cigarette lighter outlet in an automobile or truck.

Figure 1:
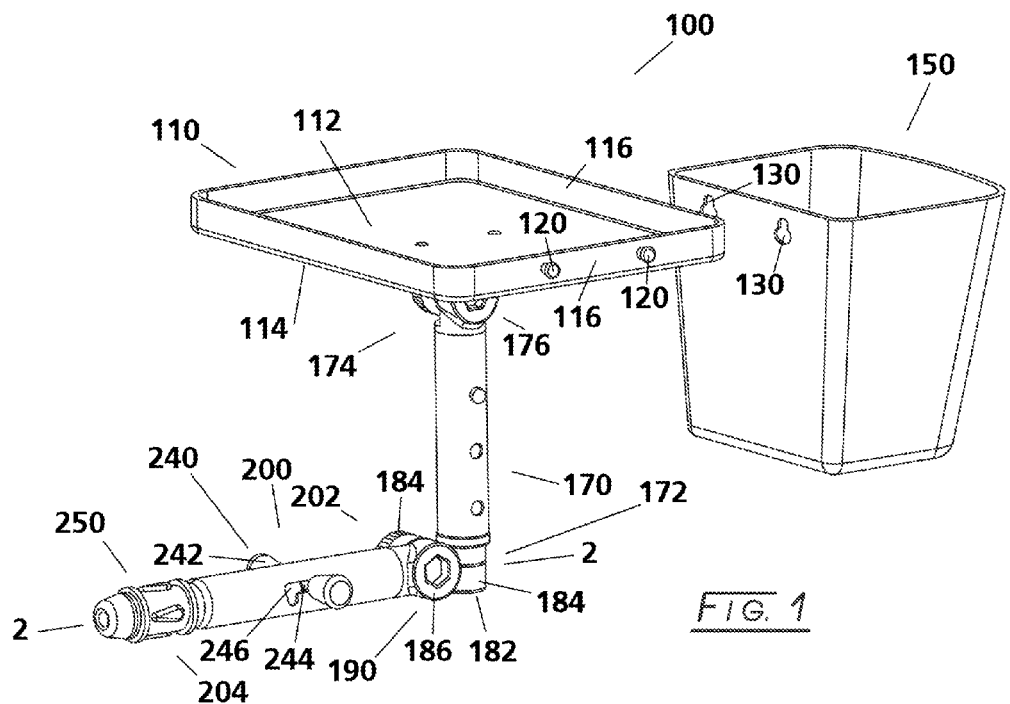
FIG. 1 shows a perspective view of an embodiment of the disclosed invention.

A perspective view of the apparatus 100 is shown in FIG. 1. A positionable utility tray 110 with a planar tray top surface 112, a tray bottom surface 114, and at least one edge surface 116 substantially orthogonal to the tray top surface and the tray bottom surface. Essentially the tray functions to hold any objects, or to provide a utility workspace area, and may be fitted with a non-slip surface, or clips to hold objects in place to avoid shifting during movement of the vehicle. The tray, and particularly the tray edge surface 116 can be provided with a number of fasteners for hanging accessories or personal items from the tray. One such fastener is embodied as a fastener projection 120, comprising a top plate, preferably round, and a shaft, which attaches the fastener projection to the tray, and spaces the top plate out from the tray edge. Thus the fastener is extending outwardly from the edge surface 116 and has a fastener head portion 126 and a fastener neck portion 124 (See FIGS. 2, 3). Optionally, a one or more workstation accessories, such as box 150, with a keyhole shaped aperture 130 allow for releasably securing the various workstation accessories, such as a paper pad, a waste receptacle, a drink holder, a food holder, or the like to the fastener projection of the utility tray.

The apparatus is further embodied with a tray support system comprising a telescopically extendable elongate extending arm 170 having a length, a proximal end 172, and a distal end, 174, and a first pivot connection 176 between the extending arm distal end 174 and the tray bottom surface 114. Pivot connection 176 can be embodied as a simple hinged joint, rotating about a single axis, or about to or three axes. A second pivot connection 190 can be optionally provided between the extending arm proximal end and a securing arm distal end. Thus, a barrel joint, as at 190, 182, can be loosened, by turning knurled rings 184, or by turning knurled rings 184 in conjunction with nut 186, allowing the tray upper surface to be positioned in three dimensions.

As described, the extending arm is connected to an elongate securing arm 200, having a distal end 202, a proximal end 204, with the second pivot connection 190 between the extending arm proximal end 172 and the securing arm distal end 202. For sake of clarity, the securing arm is considered to have an axis 2-2. The securing arm is preferably configured as a hollow tube, of rigid plastic, aluminum, or similar structural components. The securing arm also may be provided with a slide lock, generally at 240, with a knob 242, slide pin 244, and a slide cavity 246. Turning briefly to FIG. 4, the securing arm 200 has an exterior surface 210 and an interior surface 212, wherein the exterior surface 210 cross section with respect to the securing arm axis defines a securing arm exterior boundary.

Finally, socket mount 250 is fixed to the end of securing arm 200, through a press fit, glue, threads or other means known to artisans. Socket mount 250 is formed to securely lock the device into a socket 252, such as a vehicle power outlet. Said socket may be of a variety of shapes and sizes, for which socket mount 250 is adjustable to fit.

Figure 2:
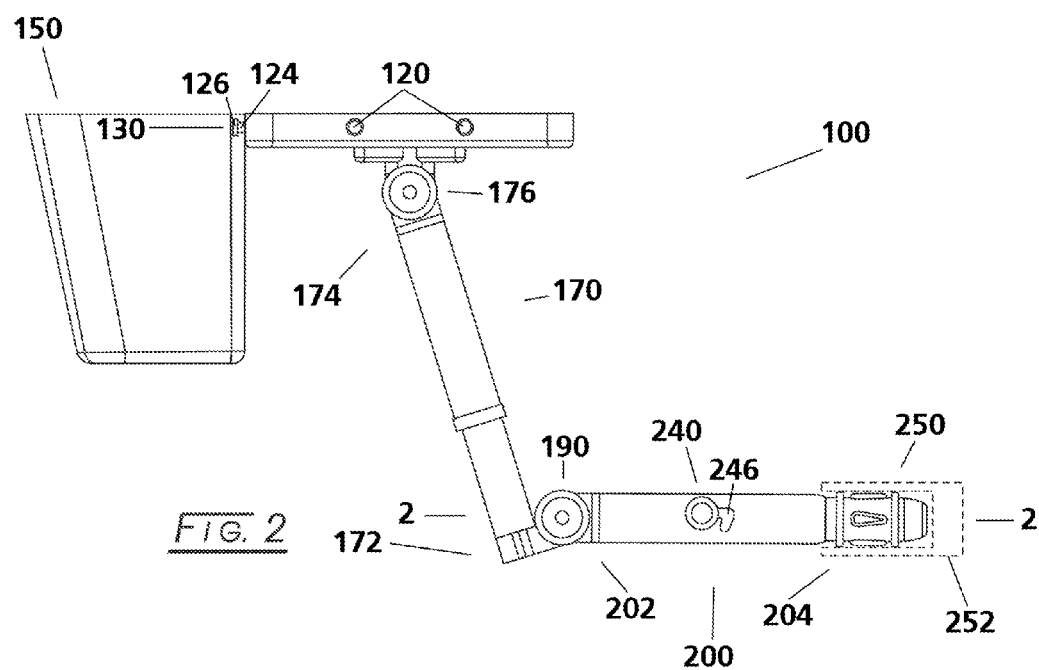
FIG. 2 shows a side view of the embodiment of the disclosed invention shown in FIG. 1.

FIG. 2 shows a side view of apparatus 100, shown in FIG. 1. FIG. 2 shows box 150 hanging from tray edge 116. Fastener 120 is extends from the edge surface 116, showing fastener head portion 126 and a fastener neck portion 124. Box 150, with its keyhole shaped aperture 130 is locked to tray edge 116 by press fit on the keyhole aperture, for instance of one or more fastener 120.

FIG. 3 shows a top view of the apparatus shown in FIGS. 1 and 2. Box 150 hangs from fastener 120, and can function as a trash receptacle, or French fry holder, for example. Similarly, cup-holder 290 can hang from other fasteners, as can pocket 292. Pocket 292 can be configured to hold a telephone or portable music device, such as an iPod, for instance. Optionally, a USB, auxiliary audio output, or power supply cord can be provided in conjunction with the apparatus, for instance through a conduit, or wiring attached to the outside surface of the apparatus. In a preferred embodiment, a power outlet socket, essentially identical to socket 252 is provided to replace the socket occupied by mount 250.

Turning to mount 250, the mount may be provided to withdraw power output from the socket through metal wired contacts, such as contact 254. Mount 250 comprises a tapered mount nose 256 and mount barrel 258. Mount barrel is provided with projecting retaining fingers 260, and spacers 262, with the spacers being formed of rubber rings, such as O-rings, hard plastic washers or the like. Mount tail piece 264 is disposed into securing arm end 204.

Turning to FIG. 4, a cross section of the mount 250 along line 4-4 of FIG. 3 is shown. Slide lock 244, configured as a shaft attached to slide knobs 242 travels through slide cavity 246, as two slide lock slots that cut through the securing arm interior and exterior surfaces and are positioned symmetrically about a plane of symmetry intersecting the securing arm axis 2-2. The workstation securing mount 250 is configured for engaging with the securing socket 252. Engagement and locking in position is accomplished by actuation of the slide lock within the securing arm to urge forward a cylindrical plunger 270 comprised of a plunger axis aligned with the securing arm axis, a proximal tapered expansion end 278, a cylindrical shaft 272, connecting to a distal resilient buffer end 274, bearing against the securing arm slide pin 244. The expansion end 278 cross section with respect to the plunger axis forms a wedge at the proximal end, and the plunger, i.e. plunger shaft 272 is supported by the plunger collar 268 and slidable forward towards the securing mount nose with respect to the securing arm interior surface. Plunger collar 268, also bears against the securing arm interior surface to fix the securing mount 250 to the securing arm.

The slide pin 244 is in close juxtaposition to the compressible plunger buffer end 274, and positioned orthogonally with respect to the securing arm axis and the plunger axis, allowing the plunger to be reversibly be positioned in a locking position as shown in FIG. 5. Advancement of the plunger in response to movement forward of the slide pin drives a coaxial expanding collet 280 positioned to receive the plunger expansion end 278 and having an inner cross section diameter profile with respect to the securing arm axis such that moving the plunger expansion end 278 into the locking position expands the expanding collet radially outward from the securing arm axis. Expansion of the collet pushes a plurality of fingers (preferably of resilient material such as rubber) distributed in radial positions about the securing arm axis out ward toward the inner surface 253 of the socket 252. The finger retainer portion 266 of mount barrel 258 maintains the overall profile of the barrel within the socket. Each of the plurality of rubber fingers has an interior surface bearing against the collet, and an exterior surface which may bear against the walls of the socket. Thus, the interior surface abuts the expanding collet such that when the plunger is advanced into the locking position, the exterior surface of each rubber finger moves radially outward from the securing arm axis and beyond the securing arm exterior boundary, thereby creating a larger effective radius. When the securing mount is placed in the socket, followed by advancing the slide pin to the locking position, the fingers extend, bear against the socket inner wall and secures the mount securing end within the socket. Thus secured, the tray apparatus can be positioned, allowing the extending arm and utility tray to be positioned as determined by the user, allowing the tray top surface to be used to hold personal items, and a workstation accessory to be mounted on the fasteners.

Returning briefly to FIG. 1, extending arm 170 is preferably configured as a telescoping arm, possibly formed of two nesting metal tubes. The inner tube, not shown in FIG. 1, is attached at the proximal end to the second pivot connection 190, and the outer extending arm tube is attached to the first pivot connection 176 at the extending arm distal end. The relative position of the coaxial components of the extending arm can be adjusted by a number of mechanisms, such as by coarse threads, an adjustable set screw or the like. Preferably, spring loaded locks 300 are provided that engage in a number of detents or holes, allowing the locks to be depressed, and the extending arm adjusted, then re-locked into place. As shown in FIG. 1, a series of aligning holes 302 are provided in the inner and outer extending arm barrels. Thus, the spring loaded locks 300 can be depressed and the extending arm extended to one of several predetermined aligning hole locations, and then locked into place by the locks 300.

A further embodiment of the apparatus provides for the pivot connections to be lockably positionable about an angle more than 90 degrees, preferably about an angle of between 10 and 350 degrees, and further rotatable about the angle of pivot 360 degrees. In yet another embodiment the apparatus extending arm is positionable at two or more predetermined lengths by detent locks, and more preferably three or four or five predetermined lengths.

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Since certain changes may be made in the above compositions and methods without departing from the scope of the invention herein involved, it is intended that all matter contained in the above descriptions and examples or shown in the accompanying drawings shall be interpreted as illustrative and not in a limiting sense. In this application all units are in the metric system and all amounts and percentages are by weight, unless otherwise expressly indicated. Also, all citations referred herein are expressly incorporated herein by reference. All terms not specifically defined herein are considered to be defined according to Webster's New Twentieth Century Dictionary Unabridged, Second Edition. The disclo-

We claim:

1. A portable personal workstation apparatus comprising:
   a) a utility tray comprising:
      1) a planar tray top surface;
      2) a tray bottom surface; and
      3) at least one edge surface substantially orthogonal to the tray top surface and the tray bottom surface, and having at least one fastener projection extending outwardly from the at least one edge surface and having a fastener head portion and a fastener neck portion;
   b) at least one workstation accessory having an attachment surface comprising at least one keyhole aperture for releasably securing the at least one workstation accessory to the fastener projection of the utility tray; and
   c) a support comprising:
   an elongate extending arm having a length, a proximal end, and a distal end, wherein the extending arm length is telescopically variable;
   a first pivot connection between the extending arm distal end and the tray bottom surface;
   an elongate securing arm having a proximal end, a distal end, an axis, an interior surface, an exterior surface wherein the exterior surface cross section with respect to the securing arm axis defines a securing arm exterior boundary, and two slide lock slots cut through the securing arm interior and exterior surfaces and positioned symmetrically about a plane of symmetry intersecting the securing arm axis;
   a second pivot connection between the extending arm proximal end and the securing arm distal end; and
   a workstation securing mount for engaging with a securing socket comprising:
      within the securing arm a cylindrical plunger comprising a plunger axis aligned with the securing arm axis, said plunger further comprising a proximal tapered expansion end, a cylindrical shaft, connecting a distal resilient buffer end, said buffer end bearing against a securing arm slide pin, said expansion end cross section with respect to the plunger axis forming a wedge at the proximal end, wherein the plunger is supported by a plunger collar and slidable with respect to the securing arm interior surface;
      the slide pin coupled to the plunger buffer end and positioned orthogonally with respect to the securing arm axis and the plunger axis, allowing the plunger to be reversibly be positioned in a locking position and further comprising;
      a coaxial expanding collet positioned to receive the plunger expansion end and having an inner cross section diameter profile with respect to the securing arm axis such that moving the plunger expansion end into the locking position expands the expanding collet radially outward from the securing arm axis; and
      a plurality of rubber fingers distributed in radial positions about the securing arm axis, each of the plurality of rubber fingers having an interior surface and an exterior surface, wherein the interior surface abuts the expanding collet such that when the plunger is advanced into the locking position, the exterior surface of each rubber finger moves radially outward from the securing arm axis and beyond the securing arm exterior boundary, thereby creating a larger effective radius whereby placement of the securing end into the socket, and advancing the slide pin to the locking position secures the securing end with the socket, allowing the extending arm and utility tray to be positioned as determined by the user, allowing the tray top surface to be used to hold personal items, and a workstation accessory to be mounted on the fasteners.

2. The apparatus of claim 1 wherein the socket is a socket provided for engaging a vehicle power outlet.

3. The apparatus of claim 2 wherein the vehicle power outlet is a cigarette lighter port accessible to a vehicle operator.

4. The apparatus of claim 1 wherein each of said first and second pivot connections is lockably positionable about an angle more than 90 degrees.

5. The apparatus of claim 1 wherein the extending arm is positionable at two or more predetermined lengths by detent locks.

6. The apparatus of claim 1 wherein the tray edges provide for mounting two or more workstation accessories.

7. The apparatus of claim 1 further comprising a power outlet that is one or more of a USB connection, a 12 volt power supply, a min-USB connector, an Apple compatible connector or a firewire connector.

8. The apparatus of claim 1 wherein the tray top surface further comprises a non-slip surface.

9. The apparatus of claim 1 further comprising the plurality of fingers that is three or more fingers.

10. A cylindrical securing mount for engaging with a socket comprising:
   a) an elongate cylindrical securing arm having a proximal end, a distal end, an axis, an interior surface, an exterior surface wherein the exterior surface cross section with respect to the securing arm axis defines a securing arm exterior boundary, and two slide lock slots cut through the securing arm interior and exterior surfaces and positioned symmetrically about a plane of symmetry intersecting the securing arm axis;
   b) within the securing arm a cylindrical plunger comprising a plunger axis aligned with the securing arm axis, said plunger further comprising a proximal conically tapered expansion end, a cylindrical shaft, connecting a distal resilient buffer end, said buffer end bearing against a securing arm slide pin, said expansion end cross section with respect to the plunger axis forming a conical wedge at the proximal end, wherein the plunger is supported by a plunger collar and slidable with respect to the securing arm interior surface;
   c) the slide pin coupled to the plunger buffer end and positioned orthogonally with respect to the securing arm axis and the plunger axis, allowing the plunger to be reversibly positioned in a locking position;
   d) a coaxial expanding collet positioned to receive the plunger expansion end and having an inner cross section diameter profile with respect to the securing arm axis such that advancing the plunger expansion end into the locking position expands the expanding collet radially outward from the securing arm axis, expanding a resilient latching cylinder; and
   e) a plurality of fingers distributed in radial positions on the exterior surface of the latching cylinder about the securing arm axis, each of the plurality of rubber fingers having an interior surface and an exterior surface, wherein the interior surface abuts the expanding collet such that when the plunger is advanced into the locking position, the exterior surface of each rubber finger moves radially outward from the securing arm axis and beyond the securing arm exterior boundary, thereby creating a larger effective radius, whereby the securing mount can be placed in a socket, the slide pin advanced to the locking position, and the rubber fingers engage with the interior of the socket, holding the securing mount in place within the socket.

11. A portable personal workstation apparatus comprising:
 a) a utility tray comprising:
  1) a planar tray top surface;
  2) a tray bottom surface; and
  3) a tray support mount on the tray bottom surface;
 b) a support comprising:
  1) an elongate extending arm having a length, a proximal end, and a distal end, wherein the extending arm length is telescopically variable;
  2) a first pivot connection between the extending arm distal end and the tray bottom surface;
  3) an elongate securing arm having a proximal end, a distal end, an axis, an interior surface, an exterior surface wherein the exterior surface cross section with respect to the securing arm axis defines a securing arm exterior boundary, and two slide lock slots cut through the securing arm interior and exterior surfaces and positioned symmetrically about a plane of symmetry intersecting the securing arm axis;
  4) a second pivot connection between the extending arm proximal end and the securing arm distal end; and
  5) a workstation securing mount for engaging with a securing socket comprising:
   i) within the securing arm a cylindrical plunger comprising a plunger axis aligned with the securing arm axis, said plunger further comprising a proximal tapered expansion end, a cylindrical shaft, connecting a distal resilient buffer end, bearing against a securing arm slide pin, said expansion end cross section with respect to the plunger axis forming a wedge at the proximal end, wherein the plunger is supported by a plunger collar and slidable with respect to the securing arm interior surface;
   ii) the slide pin coupled to the plunger buffer end and positioned orthogonally with respect to the securing arm axis and the plunger axis, allowing the plunger to be reversibly be positioned in a locking position and further comprising;
   iii) a coaxial expanding collet positioned to receive the plunger expansion end and having an inner cross section diameter profile with respect to the securing arm axis such that moving the plunger expansion end into the locking position expands the expanding collet radially outward from the securing arm axis; and
   iv) a resilient latching cylinder expanding radially, wherein the latching cylinder interior surface abuts the expanding collet such that when the plunger is advanced into the locking position, the exterior surface of the latching cylinder moves radially outward from the securing arm axis and beyond the securing arm exterior boundary, whereby a larger effective radius of the resilient latching cylinder engages a mounting socket to hold the securing arm, supporting the extending arm, and holding the utility tray apparatus in a fixed position.

* * * * *